(12) United States Patent
Wang et al.

(10) Patent No.: US 7,620,145 B2
(45) Date of Patent: Nov. 17, 2009

(54) DEVICE FOR DETECTING POSITION OF STEEL BAR IN STRUCTURE AND METHOD THEREOF

(75) Inventors: Chung-Yue Wang, Taipei (TW); Peng-Ching Peng, Jhonghe (TW)

(73) Assignee: National Central University, Taoyuan (TW)

( * ) Notice: Subject to any disclaimer, the term of this patent is extended or adjusted under 35 U.S.C. 154(b) by 381 days.

(21) Appl. No.: 11/723,202

(22) Filed: Mar. 16, 2007

(65) Prior Publication Data
US 2008/0197278 A1      Aug. 21, 2008

(30) Foreign Application Priority Data
Feb. 15, 2007    (TW) ............................... 96105811 A

(51) Int. Cl.
*G01B 15/02*    (2006.01)

(52) U.S. Cl. .......................................... 378/54; 378/59
(58) Field of Classification Search .............. 378/51–69
See application file for complete search history.

(56) References Cited

U.S. PATENT DOCUMENTS 5,828,723 A * 10/1998 Mariscotti ..................... 378/58
6,118,848 A * 9/2000 Reiffel ......................... 378/65

* cited by examiner

*Primary Examiner*—Hoon Song

(57) ABSTRACT

Gamma rays, X-rays or ionizing irradiations from two radiation sources penetrate through a steel bar in a reinforced concrete structure. Images of the steel bar are thus projected on two films. Through geometric relationships between the images and the steel bar itself, thicknesses between the steel bar and surfaces of the reinforced concrete structure are obtained. The position of the steel bar obtained according to the present invention is reliable and accurate. And the data obtained can be used for structure safety.

8 Claims, 1 Drawing Sheet

DEVICE FOR DETECTING POSITION OF STEEL BAR IN STRUCTURE AND METHOD THEREOF

FIELD OF THE INVENTION

The present invention relates to detecting a position of a steel bar; more particularly, relates to computing a position of a steel bar in a structure to obtain thicknesses between a steel bar and surfaces of a reinforced concrete structure containing the steel bar with improved reliability and accuracy as a reference for structure safety.

DESCRIPTION OF THE RELATED ARTS

To obtain structure safety, detecting thickness of a protecting layer of steel bar in a structure with reliability and accuracy is more and more important. However, a reinforced concrete structure having steel bar is an uneven composite material of steel bar, concrete, sand, aggregate, water and admixture, so that examinations done by using stress waves or through electromagnetism principles still face some difficulties.

Concerning examining steel bar in a structure, electromagnetism principles are usually used; yet their accuracies are so affected by permeability, conductivity, steel bar interval and steel bar construction that difficulties and errancies in examinations increase.

For example, a steel bar detector using eddy current is developed. A detector having an alternating wire coil is located near a detected steel bar protecting layer to produce a number of eddy-like currents through electromagnetic induction at an alternating magnetic field of the steel bar. And, by the changes in signals of eddy currents, a position and a size of the steel bar are detected. Yet, in places having multiple steel bars or jointing steel bar, interferences to electromagnetic induction occur with the neighboring steel bars and so detection using electromagnetic induction would fail and the construction quality is not guaranteed. Hence, the prior arts do not fulfill users' requests on actual use.

SUMMARY OF THE INVENTION

The main purpose of the present invention is to irradiating gamma rays from radiation sources to project images of a steel bar in a structure on two imaging devices for computing a position of the steel bar and thus thicknesses between the steel bar and surfaces of the structure through geometric relationships between the images of the steel bar and the steel bar itself.

Another purpose of the present invention is to compute the position of the steel bar with improved reliability and accuracy as a reference for a structure safety To achieve the above purposes, the present invention is a device for detecting a position of a steel bar in a structure and a method thereof, comprising a first radiation source, a second radiation source, a first imaging device, a second imaging device and a computing module, where, through gamma rays irradiated from the radiation sources, a steel bar in a structure has its images projected on the imaging devices; and a position of the steel bar together with thicknesses between the steel bar and surfaces of the structure is thus computed through geometric relationships between the images of the steel bar and the steel bar itself with improved reliability and accuracy as a reference for a structure safety. Accordingly, a novel device for measuring a size of a steel bar in a structure and a method thereof are obtained.

BRIEF DESCRIPTION OF THE DRAWING

The present invention will be better understood from the following detailed description of the preferred embodiment according to the present invention, taken in conjunction with the accompanying drawing, in which.

DESCRIPTION OF THE PREFERRED EMBODIMENT

Figure 1:
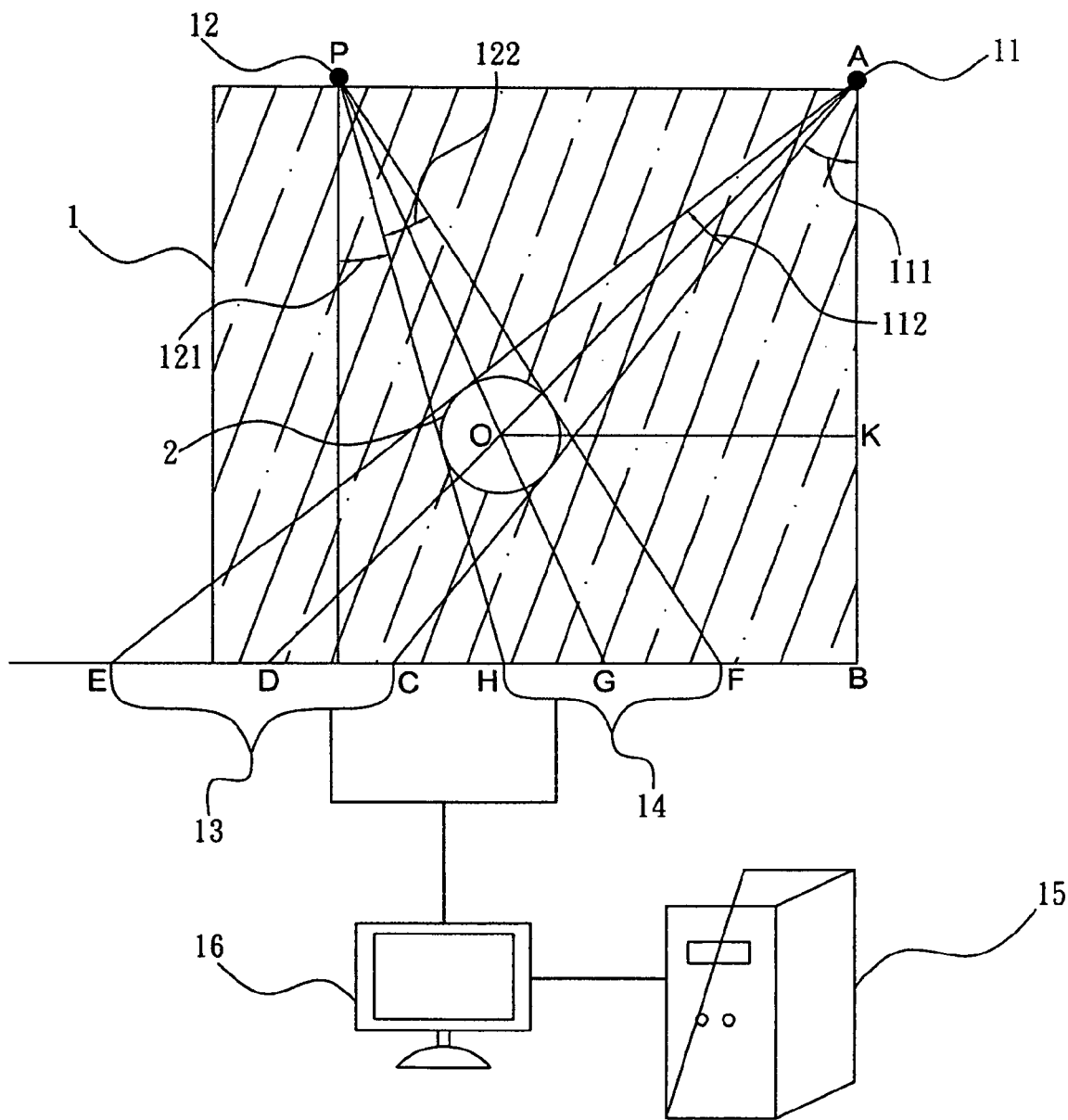
FIG. 1 is the flow view showing the preferred embodiment according to the present invention.

The following description of the preferred embodiment is provided to understand the features and the structures of the present invention.

Please refer to FIG. 1, which is a flow view showing a preferred embodiment according to the present invention. As shown in the figure, the present invention is a device for detecting a position of a steel bar in a structure and a method thereof. The device comprises a first radiation source 11, a second radiation source 11, a first imaging device 13, a second imaging device 14 and a computing module 15, where thickness between center of a steel bar 2 and surfaces of a reinforced concrete structure 1 containing the steel bar 2 is computed with improved reliability and accuracy as a reference for structure safety.

The first radiation source 11 and the second radiation source 12 are located on an upper horizontal surface of the reinforced concrete structure 1 and are gamma rays, X-rays or ionizing radiation sources.

The first imaging device 13 and the second imaging device 14 are adhered to a lower horizontal surface of the reinforced concrete structure 1; and are located at a place corresponding to the first radiation source 11 and the second radiation source 12 to receive a projected image of the steel bar by using the radiation source 11, respectively. The first imaging device 13 and the second imaging device 14 are films; or sensors, which are further connected to a display 16 to display the projected images of the steel bar with position data.

On using the present invention, the first radiation source 11 and the second radiation source 12 are adhered on the upper surface of the reinforced concrete structure 1. A gamma ray is irradiated by the first radiation source 11 and the second radiation source 12 to project images of the steel bar 2 on the first imaging device 13 and the second imaging device 14, respectively. And, through geometric relationships between the images of the steel bar 2 and the steel bar 2 itself, thickness between center of the steel bar 2 and surfaces of the reinforced concrete structure 1 is computed.

Thus, the computing module 15 computes thickness between center of the steel bar 2 and surfaces of the reinforced concrete structure 1 through the following steps:

(i) Positions of the following points are obtained: a point (A) of the first radiation source 11; a point (P) of the second radiation source 12; a point (B) on the horizontal surface of the structure; another point (J) on the horizontal surface of the structure; a first edge point (C) together with a second edge point (E) on edge of the first image of the steel bar 2; and a third edge point (F) together with a fourth edge point (H) on edge of the second image of the steel bar 2, where the A point is perpendicular to a line segment (BE) between the point B and the E point; where the B point, the J point, the C point, the E point, the F point and the H point are on the same line; where the C point is at the same side as the B point, and the E point is a corresponding point to the C point at the other side of the first image of the steel bar 2; and where the H point is at the same side as the J point, and the F point is a corresponding point to the H point at the other side of the second image of the steel bar 2.

(ii) The following lengths of line segments are obtained: a line segment (AB) between the A point and the B point; a line segment (BC) between the B point and the C point; the BE line segment; a line segment (JF) between the J point and the F point; and a line segment (JH) between the J point and the H point.

(iii) In a triangle having vertex points of the A point, the B point and the E point, a value of a first angle 111 together with a second angle 112 ($\theta_1+\theta_2$) is obtained through a tangent function of the first angle 111 together with the second angle 112

$$(\theta_1 + \theta_2),$$

$$\tan(\theta_1 + \theta_2) = \frac{BE}{AB},$$

where the first angle 111 ($\theta_1$) has an angle side of the AB line segment and the other angle side of a line segment (AC) between the A point and the C point; where the second angle 112 ($\theta_2$) has an angle side of the AC line segment and the other angle side of a line segment (AE) between the A point and the H point; and where the first angle 111 together with the second angle 112 ($\theta_1+\theta_2$) is obtained though the tangent function whose value is equivalent to the length of the BE line segment divided by the length of the AB line segment;

(iv) In a triangle having vertex points of the A point, the B point and the C point, a value of the first angle 111 ($\theta_1$) and a value of the second angle 112 ($\theta_2$) are obtained through a tangent function of the first angle 111

$$(\theta_1),$$

$$\tan(\theta_1) = \frac{BC}{AB},$$

where the value of the first angle 111 ($\theta_1$) is obtained through the tangent function, whose value is equivalent to the length of the BC line segment divided by the length of the AB line segment; and where the value of the second angle 112 ($\theta_2$) is obtained by deducing the value of the first angle 111 ($\theta_1$) from the value of the first angle 111 together with the second angle 112 ($\theta_1+\theta_2$).

(v) A center point (O) of the steel bar 2 is defined; a point (D) where a line from the A point extended through the O point is defined to be intersected with the BE line segment at the D point; and, in a triangle having vertex points of the A point, the B point and the D point, a position of the D point is obtained through a tangent function of the first angle 111 together with an abiding half of the second angle 112

$$\left(\theta_1 + \frac{\theta_2}{2}\right),$$

$$\tan\left(\theta_1 + \frac{\theta_2}{2}\right) = \frac{BD}{AB},$$

where a length of a line segment (BD) between the B point and the D point is obtained through the tangent function, whose value is equivalent to the length of the BD line segment divided by the length of the AB line segment; and thus the position of the D point is obtained.

(vi) In a triangle having vertex points of the P point, the J point and the F point, a value of a third angle 121 together with a fourth angle 122 ($\theta_3+\theta_4$) is obtained through a tangent function of the third angle 121 together with the fourth angle 122

$$(\theta_3 + \theta_4),$$

$$\tan(\theta_3 + \theta_4) = \frac{JF}{PJ},$$

where the third angle 121 ($\theta_3$) has an angle side of a line segment (PJ) between the P point and the J point and the other angle side of a line segment (PH) between the P point and the H point; where the fourth angle 122 ($\theta_4$) has an angle side of the PH line segment and the other angle side of a line segment (PF) between the P point and the F point; and where the third angle 121 together with the fourth angle 122 ($\theta_3+\theta_4$) is obtained though the tangent function, whose value is equivalent to the length of the JF line segment divided by a length of the PJ line segment, equivalent to the length of the AB line segment.

(vii) In a triangle having vertex points of the P point, the J point and the H point, a value of the third angle 121 ($\theta_3$) and a value of the fourth angle 122 ($\theta_4$) are obtained through a tangent function of the third angle 121

$$(\theta_3),$$

$$\tan(\theta_3) = \frac{JH}{PJ} = \frac{JH}{AB},$$

wherein the value of the third angle 121 ($\theta_3$) is obtained through a tangent function whose value is equivalent to the length of the JH line segment divided by the length of the PJ line segment; and where the value of the fourth angle 122 ($\theta_4$) is obtained by deducting the value of the third angle 121 ($\theta_3$) from the value of the third angle 121 together with the fourth angle 122 ($\theta_3+\theta_4$).

(viii) A point (G) is defined where a line from the P point extended through the O point is intersected with the JF line segment at the G point. And a position of the G point is obtained through a tangent function of the third angle 121 together with an abiding half of the fourth angle 122

$$\left(\theta_3 + \frac{\theta_4}{2}\right),$$

$$\tan\left(\theta_3 + \frac{\theta_4}{2}\right) = \frac{JG}{PJ},$$

where a length of a line segment (JG) between the J point and the G point is obtained through the tangent function, whose value is equivalent to the length of the JG line segment divided by the length of the PJ line segment. And, thus, the position of the G point is obtained.

(ix) Thicknesses between the center of the steel bar 2 and horizontal surfaces of the structure are obtained, where a point (K) on the AB line segment is defined as where the O point is perpendicular to the AB line segment at the K point; where a length of a line segment (DG) between the D point and the G point and a length of a line segment (AP) between the A point and the P point are obtained; and where a length of a line segment (AK) between the A point and the K point and a length of a line segment (KB) between the K point and the B point are obtained through a function, $$\frac{DG}{AP} = \frac{AK}{KB},$$

where the length of the DG line segment divided by the length of the AP line segment is equivalent to the AK line segment divided by the length of the KB line segment. Thus, a thickness between the center of the steel bar 2 and the upper horizontal surface of the structure, equivalent to the AK line segment, and a thickness between the center of the steel bar 2 and the lower horizontal surface of the structure, equivalent to the KB line segment, are obtained.

To sum up, the present invention is a device for detecting a position of a steel bar in a structure and a method thereof, where thicknesses between center of a steel bar and surfaces of a reinforced concrete structure containing the steel bar is obtained with improved reliability and accuracy as a reference for structure safety.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device for detecting a position of a steel bar in a structure, comprising:
    a structure, said structure having a steel bar;
    a first radiation source, said first radiation source being located on a horizontal surface of said structure to irradiate said structure;
    a second radiation source, said second radiation source being located at a position different from that of said first radiation source on said horizontal surface of said structure to irradiate said structure;
    a first imaging device, said first imaging device being deposed on a horizontal surface of said structure corresponding to said first radiation source, a first image of said steel bar in said structure being projected on said first imaging device by using said first radiation source;
    a second imaging device, said second imaging device being deposed on said horizontal surface of said structure corresponding to said second radiation source at a position different from that of said first imaging device, a second image of said steel bar in said structure being projected on said second imaging device by using said second radiation source; and
    a computing module, said computing module computing a size of said steel bar in said structure through geometric relationships between said first image of said steel bar, said second image of said steel bar and said steel bar itself,
    wherein said computing module is configured to perform a computation comprising the steps of:
    (i) obtaining:
    a point (A) of said first radiation source;
    a point (P) of said second radiation source;
    a point (B) on said horizontal surface of said structure;
    another point (J) on said horizontal surface of said structure;
    a first edge point (C) together with a second edge point (E) on edge of said first image of said steel bar; and
    a third edge point (F) together with a fourth edge point (H) on edge of said second image of said steel bar;
    wherein said A point is perpendicular to said B point;
    wherein said B point, said J point, said C point, said E point, said F point and said H point are on a line;
    wherein said C point is at the same side as said B point and said E point is a corresponding point to said C point at the other side of said first image of said steel bar; and
    wherein said H point is at the same side as said J point and said F point is a corresponding point to said H point at the other side of said second image of said steel bar;
    (ii) obtaining:
    a length of a line segment (AB) between said A point and said B point;
    a length of a line segment (BC) between said B point and said C point;
    a length of line segment (BE) between said B point and said E point;
    a length of a line segment (JF) between said J point and said F point; and
    a length of a line segment (JH) between said J point and said H point;
    (iii) obtaining a value of a first angle together with a second angle through a tangent function of said first angle together with said second angle,
    wherein said first angle has an angle side of said AB line segment and the other angle side of a line segment (AC) between said A point and said C point;
    wherein said second angle has an angle side of said AC line segment and the other angle side of a line segment (AE) between said A point and said H point; and
    wherein said first angle together with said second angle is obtained though said tangent function whose value is equivalent to said length of said BE line segment divided by said length of said AB line segment;
    (iv) obtaining a value of said first angle and a value of said second angle through a tangent function of said first angle,
    wherein said value of said first angle is obtained through said tangent function whose value is equivalent to said length of said BC line segment divided by said length of said AB line segment; and
    wherein said value of said second angle is obtained by deducting said value of said first angle from said value of said first angle together with said second angle;
    (v) defining a center point (O) of said steel bar;
    defining a point (D) where a line from said A point extended through said O point to be intersected with said BE line segment at said D point; and
    obtaining a position of said D point through a tangent function of said first angle together with an abiding half of said second angle,
    wherein a length of a line segment (BD) between said B point and said D point is obtained through said tangent function whose value is equivalent to said length of said BD line segment divided by said length of said AB line segment and thus said position of said D point is obtained;
    (vi) obtaining a value of a third angle together with a fourth angle through a tangent function of said third angle together with said fourth angle,
    wherein said third angle has an angle side of a line segment (PJ) between said P point and said J point and the other angle side of a line segment (PH) between said P point and said H point;

wherein said fourth angle has an angle side of said PH line segment and the other angle side of a line segment (PF) between said P point and said F point; and wherein said third angle together with said fourth angle is obtained though said tangent function whose value is equivalent to said length of said JF line segment divided by a length of said PJ line segment, which is equivalent to said length of said AB line segment;

(vii) obtaining a value of said third angle and a value of said fourth angle through a tangent function of said third angle, wherein said value of said third angle is obtained through a tangent function whose value is equivalent to said length of said JH line segment divided by said length of said PJ line segment; and wherein said value of said fourth angle is obtained by deducting said value of said third angle from said value of said third angle together with said fourth angle;

(viii) defining a point (G) where a line from said P point extended through said O point to be intersected with said JF line segment at said G point; and obtaining a position of said G point through a tangent function of said first angle together with an abiding half of said second angle, wherein a length of a line segment (JG) between said J point and said G point is obtained through said tangent function whose value is equivalent to said length of said JG line segment divided by said length of said PJ line segment and thus said position of said G point is obtained;

(ix) obtaining thicknesses between said center of said steel bar and horizontal surfaces of said structure, wherein a point (K) on said AB line segment is defined as where said O point is perpendicular to said AB line segment at said K point;

wherein a length of a line segment (DG) between said D point and said G point and a length of a line segment (AP) between said A point and said P point are obtained; and wherein a length of a line segment (AK) between said A point and said K point, which is a thickness between said center of said steel bar and a horizontal surface of said structure, and a length of a line segment (KB) between said K point and said B point, which is a thickness between said center of said steel bar and another horizontal surface of said structure, are obtained where said length of said DG line segment divided by said length of said AP line segment is equivalent to said AK line segment divided by said length of said KB line segment.

2. The device according to claim 1, wherein said structure is a structure of a reinforced concrete.

3. The device according to claim 1, wherein said first radiation source and said second radiation source are gamma ray radiation sources.

4. The device according to claim 1, wherein said first radiation source and said second radiation source are X-ray radiation sources.

5. The device according to claim 1, wherein said first radiation source and said second radiation source are ionizing radiation sources.

6. The device according to claim 1, wherein said first imaging device and said second imaging device are films to display said projected images of said steel bar.

7. The device according to claim 1, wherein said first imaging device and said second imaging device are sensors to display said projected images of said steel bar.

8. The device according to claim 7, wherein said sensors are further connected to a display to display said projected images of said steel bar with position data.

* * * * *